(No Model.)

C. BENKER.
WATER ELEVATOR.

No. 389,831. Patented Sept. 18, 1888.

WITNESSES
O. M. Clarke
F. Ricketts

INVENTOR,
Christian Benker
Frank A. Fouts Att'y.

UNITED STATES PATENT OFFICE.

CHRISTIAN BENKER, OF PITTSBURG, PENNSYLVANIA, ASSIGNOR OF ONE-HALF TO J. S. McMASTER.

WATER-ELEVATOR.

SPECIFICATION forming part of Letters Patent No. 389,831, dated September 18, 1888.

Application filed September 3, 1887. Serial No. 248,680. (No model.)

*To all whom it may concern:*

Be it known that I, CHRISTIAN BENKER, a citizen of Germany, residing at Pittsburg, in the county of Allegheny and State of Pennsylvania, have invented certain new and useful Improvements in Water-Elevators; and I do hereby declare the following to be a full, clear, and exact description of the invention, such as will enable others skilled in the art to which it appertains to make and use the same.

My invention is a water-elevator; and it consists in the parts which will be hereinafter described, and pointed out in the claims.

Figure 2:
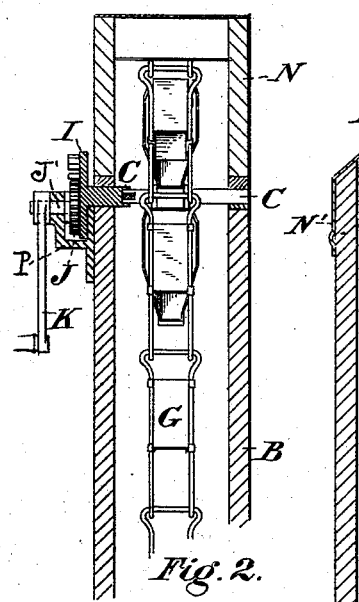
Figure 1:
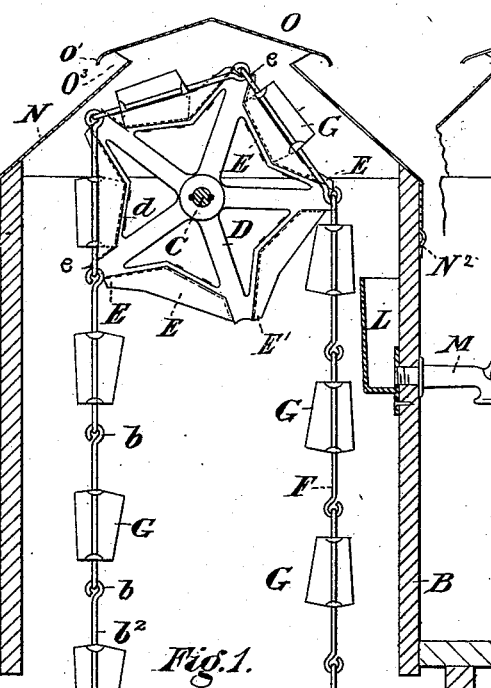
Figure 3:
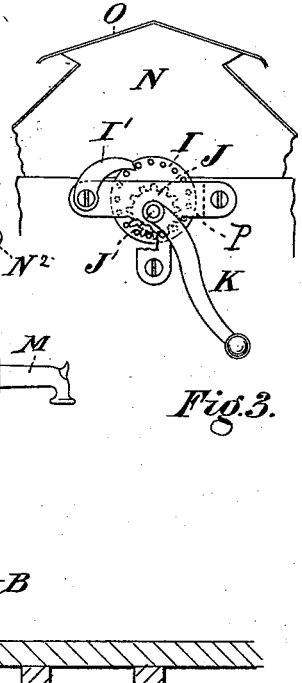
Figure 4:
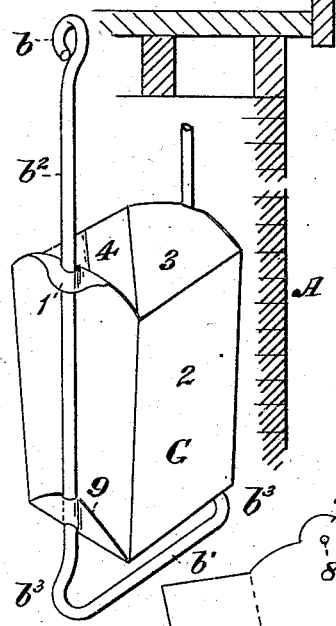
Figure 5:
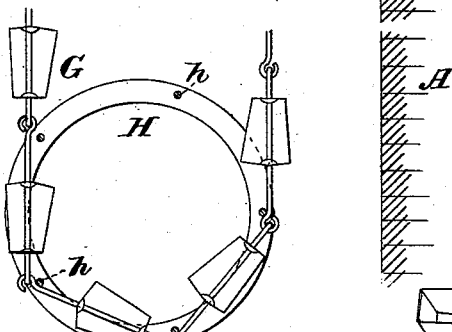
Figure 5:
Figure 6:
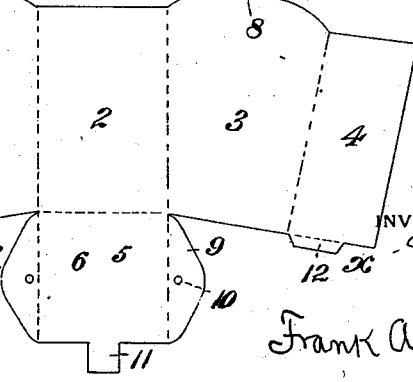

In the accompanying drawings, Figure 1 represents a side view of the sprocket-wheels, the chain and its buckets, and the weighted bottom wheel, the walls of the well, the top casing, and the spout and its trough being shown in section. Only one of the rims of the weighted wheel is shown in this view, and the short connecting cross-bars are shown in section. Fig. 2 represents an end view of the sprocket-wheel, its shaft having a ratchet-wheel, a crank whose shaft is provided with a spur-wheel in engagement with the ratchet, said shafts being eccentrically mounted, the casing being shown in section. Fig. 3 represents a side view in fragment of the upper part of the casing, its cap, the pawl and ratchet, spur-wheel, shaft, and crank. Fig. 4 represents a perspective view of one of the buckets and one of the links of the chain secured thereto. Fig. 5 represents a perspective view of one of the sprocket-wheel troughs and its spout, and Fig. 6 is a plan view of a blank from which the buckets are formed.

Like letters indicate corresponding parts in the several views.

The letter A represents the walls of a well, and B a casing mounted above the well.

C indicates a shaft journaled in boxes secured in the sides of the casing. Said shaft is provided with a sprocket-wheel, D, rigidly secured thereto. Formed with said wheel and between the spokes thereof is a series of bent pieces, $d$. Each of said pieces forms a seat for one of the troughs E and its spout E'. Said pieces, troughs, and spouts are rigidly united.

The letter F represents an endless sprocket-chain. Each link of the chain is in the form of a yoke, the ends whereof, $b$ $b$, are looped. The end of each link opposite from the looped ends is straight and normally lies in a horizontal plane. The straight part of the link $b'$ is longer than the space between the parallel side pieces, $b^2$. The sides of the link near the straight end are curved outward at $b^3$. The looped ends on one link are engaged to the straight end piece of the adjoining link. Said straight end piece $b'$ and the curved or recessed sides thereof permit a slight limited lateral movement of the engaged loops of the attached link.

The letter G represents one of the buckets. Each link has one of these buckets rigidly attached thereto. The bucket is secured between the loops and straight end or cross-piece of the link. The link is longer than the depth of a bucket, so that each end of a link may be easily engaged to an adjoining link and the links and buckets moved freely over the sprocket-wheel. The bucket is formed of the metallic blank shown in Fig. 6.

Figs. 1, 2, 3, and 4 represent the several parts of the blank constituting the sides of said bucket.

Fig. 5 indicates the bottom of the bucket. Said bottom is provided with a small opening, 6, to permit the escape of air when the bucket is submerged in water. The upper sides of the parts 1 and 3 are each provided with lips 7, having an opening, 8, therein. The bottom piece, 6, is provided with two side lips, 9. Each lip 9 is provided with an opening, 10.

11 represents a lip on the bottom piece, 5, and 12 indicates two lips on the under sides of the respective side pieces 4.

The bucket is formed by bending the blank on the dotted lines. The pieces 4 4 lap and are united by solder or rivets opposite from the side piece 2. The lip 11 is turned up on the outside of the side pieces 4 4 at $xx$, and the lips 12, when the parts are bent together, lie respectively on the sides of the lip 11. The lips 12 are turned under the bucket and lie against the outer side of the bottom piece, 5. The parallel side pieces of the link are engaged, respectively, within the openings 8 10. When so engaged the lips 9 are turned upward and the lips 7 turned downward, the side pieces of the link being secured in said openings by solder.

The letter H represents a weighted wheel formed of two rims of equal size. These rims are rigidly united by a series of short parallel bars, $h$, secured between the rims at equidistant points, the space between said bars being equal to the length of a link, and the space between the rims being sufficient to permit the chain and buckets to pass between freely. As the chain passes around the wheel the bars of said wheel engage the joints of the chain between the buckets. The wheel serves to hold the upward and the downward moving parts of the chain in parallel lines and prevent the oppositely-moving buckets from coming in contact. The weight of the wheel always holds it at the bottom, and said wheel rotates as the chain is wound around the sprocket-wheel.

The letter I represents a rack-wheel secured to the outer end of the shaft C, and I' represents a pawl for engaging said wheel. The teeth of the rack-wheel are in the form of pins which extend outward from the face of said wheel.

J represents a spur-wheel mounted on a short shaft, J'. On the outer end of said shaft is the crank K. The shafts C J' are eccentric. The inner end of the shaft J' and its spur-wheel lie close to the face of the ratchet-wheel, within the circle formed by the pins. Said spur-wheels and pins engage. The shaft J' and its spur-wheel J are mounted in a frame, P, independently of the ratchet I and its shaft.

The letter L represents a water-receiving trough secured within the casing, so as to receive the water from the spouts E' and discharge it through the spout M.

N represents a cap for the casing B. This cap is provided with the pieces N', which are recessed so as to fit over and engage horizontal beads $N^2$ on the sides of the casing, the object being to firmly unite the cap to the casing. The upper part of the cap is provided with a crown-piece, O. The sides of the cap under said crown-piece are provided with openings $O^3$ for the admission of air to the casing. Overhanging projections O' on the crown-piece prevent rain from entering the openings aforesaid.

The operation is as follows: The parts are connected substantially as shown in Fig. 1. The crank is then turned. The crank rotates the short shaft J' and its spur-wheel. Said spur-wheel imparts a rotary motion to the ratchet I, shaft C, and sprocket-wheel D. The trough E, which is fixed to the sprocket-wheel, is of a sufficient depth to receive about one-half of a bucket. The outer points, $c$, on the spokes of the sprocket-wheel engage the respective cross-pieces $b'$ of the chain. The chain and its buckets are thereby continuously carried over the sprocket-wheel. The upwardly-moving buckets are presumed to be filled with water. The water remains in said upwardly-moving buckets while the chain is in a vertical line. As the several buckets and the links carrying the same are carried over the sprocket-wheel each bucket in turn is first turned on its side inside of one of the troughs E and the contents of the bucket partly turned into said trough. As the bucket is carried still farther over the sprocket-wheel the contents of both trough and bucket are discharged out of the spout E' of the trough into the receiver L and thence out of the spout M. The buckets descend into the water mouth downward and thereby carry air into the water. In order to permit the air to make its escape while the bucket is submerged, I provide the bottom of each bucket with a small opening, 6.

The object in employing a small spur-wheel in engagement with a larger ratchet-wheel is to lessen the power required to rotate the crank and connected parts.

The shaft C is made in two parts, as shown in Fig. 2, so that the parts may be more easily put together. The two parts of the shaft may be united by any suitable means.

Having thus described my invention, I claim as new and desire to secure by Letters Patent of the United States—

1. In a water-elevator, the combination of the casing, the shaft C, having the sprocket-wheel with a series of bends, $d$, the troughs, E, having spouts E', rigidly secured in said bends, the endless chain F, engaging the sprocket-wheel and having buckets G, adapted to enter and discharge into the troughs E, and the receiving-trough L and spout M, substantially as specified.

2. In a water-elevator, the combination of the casing B and shaft C, the suspended weighted wheel H, having pins $h$, the sprocket-wheel D, with pins $e$, mounted on said shaft, and having bends $d$, with troughs E, provided with spouts E', secured in said bends, the endless chain F, connected to wheels H D by means of their pins $e$ $h$, said chain having buckets G, adapted to enter and discharge their contents into troughs E, and the receiving-trough L and spout M, substantially as described.

In testimony whereof I affix my signature in presence of two witnesses.

CHRISTIAN BENKER.

Witnesses:
FRANK A. FOUTS,
CHAS. S. WIEDERHOLD.